(12) United States Patent
Byers et al.

(10) Patent No.: US 9,221,340 B2
(45) Date of Patent: Dec. 29, 2015

(54) MACHINE CONTROL SYSTEM

(75) Inventors: Brian A. Byers, Decatur, IL (US); David R. Wisley, Peoria, IL (US); Fazal A. Goraya, Peoria, IL (US); Gerard O. McCann, Dunlap, IL (US); Justin L. Steinlage, Mackinaw, IL (US); Kevin Grover, Chambersburg, PA (US); Nathan S. Pauli, Peoria, IL (US); Yun Liu, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 531 days.

(21) Appl. No.: 13/538,044

(22) Filed: Jun. 29, 2012

(65) Prior Publication Data
US 2014/0005898 A1    Jan. 2, 2014

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *B60K 28/16* | (2006.01) | |

(52) U.S. Cl.
CPC .......... *B60K 28/16* (2013.01); *B60W 2520/105* (2013.01); *B60W 2520/14* (2013.01); *B60W 2520/26* (2013.01); *B60W 2520/28* (2013.01); *B60Y 2200/411* (2013.01)

(58) Field of Classification Search
CPC . B60T 2240/06; B60T 8/172; B60T 2230/03; B60T 8/1755; B60T 2210/22; B60T 8/00; B60T 8/3275; B60T 8/4872; B60T 13/662; B60T 2201/02; B60T 2201/09; B60T 2210/24; B60W 10/10; B60W 10/101; B60W 10/184; B60W 2050/0004; B60W 2050/0026; B60W 2050/0083

See application file for complete search history.

(56) References Cited

U.S. PATENT DOCUMENTS

| | | | | |
|---|---|---|---|---|
| 3,632,176 | A * | 1/1972 | Gaeke | 303/112 |
| 5,168,952 | A | 12/1992 | Oono | |
| 5,463,551 | A | 10/1995 | Milunas | |
| 5,471,386 | A * | 11/1995 | Hrovat et al. | 701/82 |
| 5,574,643 | A | 11/1996 | Yesel | |
| 5,682,316 | A * | 10/1997 | Hrovat et al. | 701/84 |
| 5,734,595 | A * | 3/1998 | Matsuno | 701/104 |
| 5,921,889 | A * | 7/1999 | Nozaki et al. | 477/158 |
| 6,141,618 | A | 10/2000 | Yamashita | |
| 6,174,255 | B1 | 1/2001 | Porter | |
| 6,208,929 | B1 * | 3/2001 | Matsuno et al. | 701/89 |
| 6,308,127 | B1 * | 10/2001 | Tsunehara | 701/84 |
| 6,549,840 | B1 * | 4/2003 | Mikami et al. | 701/69 |
| 6,631,320 | B1 * | 10/2003 | Holt et al. | 701/83 |
| 7,349,776 | B2 * | 3/2008 | Spillane et al. | 701/36 |
| 7,543,670 | B2 * | 6/2009 | Tamai et al. | 180/197 |
| 7,770,681 | B2 * | 8/2010 | Marathe et al. | 180/197 |
| 7,974,756 | B2 | 7/2011 | Ikari | |
| 2005/0027402 | A1 * | 2/2005 | Koibuchi et al. | 701/1 |
| 2011/0155100 | A1 | 6/2011 | Matsuda | |
| 2012/0130600 | A1 * | 5/2012 | Thomson et al. | 701/50 |

* cited by examiner

*Primary Examiner* — Bhavesh V Amin

(57) ABSTRACT

A control system for a machine having a transmission system is provided. The control system includes a wheel speed sensor and a controller. The wheel speed sensor is configured to generate a signal indicative of a wheel speed. The controller is in communication with the wheel speed sensor. The controller is configured to modulate a parameter of a power source based, at least in part, on a comparison of the wheel speed and a localized speed of the machine near the wheel.

27 Claims, 6 Drawing Sheets

MACHINE CONTROL SYSTEM

TECHNICAL FIELD

The present disclosure relates to machine control systems and more particularly to a wheel slip reduction system for a machine.

BACKGROUND

A mechanism for controlling wheel slip is utilized in a variety of machines to provide better traction control and also improve operational efficiency of the machine. For example, U.S. Pat. No. 7,543,670 discloses a wheel slip control system including wheel speed sensors that generate wheel speed signals and a control module that controls torque production of at least one of an engine and an electric motor and that detects a negative wheel slip based on the wheel speed signals. The control module increases torque production of at least one of the engine and the electric motor when the negative wheel slip is detected.

SUMMARY OF THE DISCLOSURE

In one aspect of the present disclosure a control system for a machine having a transmission system is provided. The control system includes a wheel speed sensor and a controller. The wheel speed sensor is configured to generate a signal indicative of a wheel speed. The controller is in communication with the wheel speed sensor. The controller is configured to modulate a parameter of a power source based, at least in part, on a comparison of the wheel speed and a localized speed of the machine near the wheel.

In another aspect, a method for controlling a machine having a transmission system is provided. The method receives a signal indicative of a wheel speed from a wheel speed sensor. The method modulates a parameter of a power source based, at least in part, on a comparison of a wheel speed and a localized speed of the machine near the wheel.

Other features and aspects of this disclosure will be apparent from the following description and the accompanying drawings.

DETAILED DESCRIPTION

Figure 1:
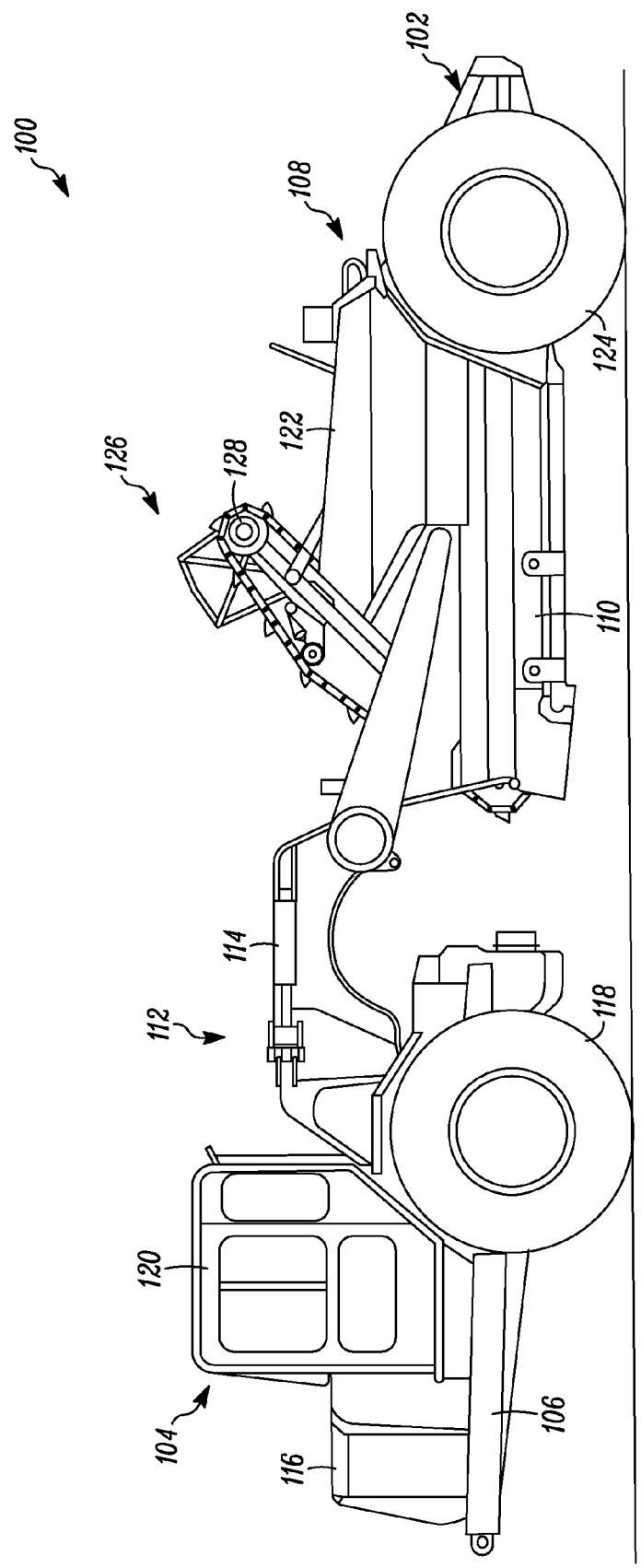
FIG. 1 is a diagrammatic view of an exemplary machine, according to one embodiment of the present disclosure.
Figure 2:
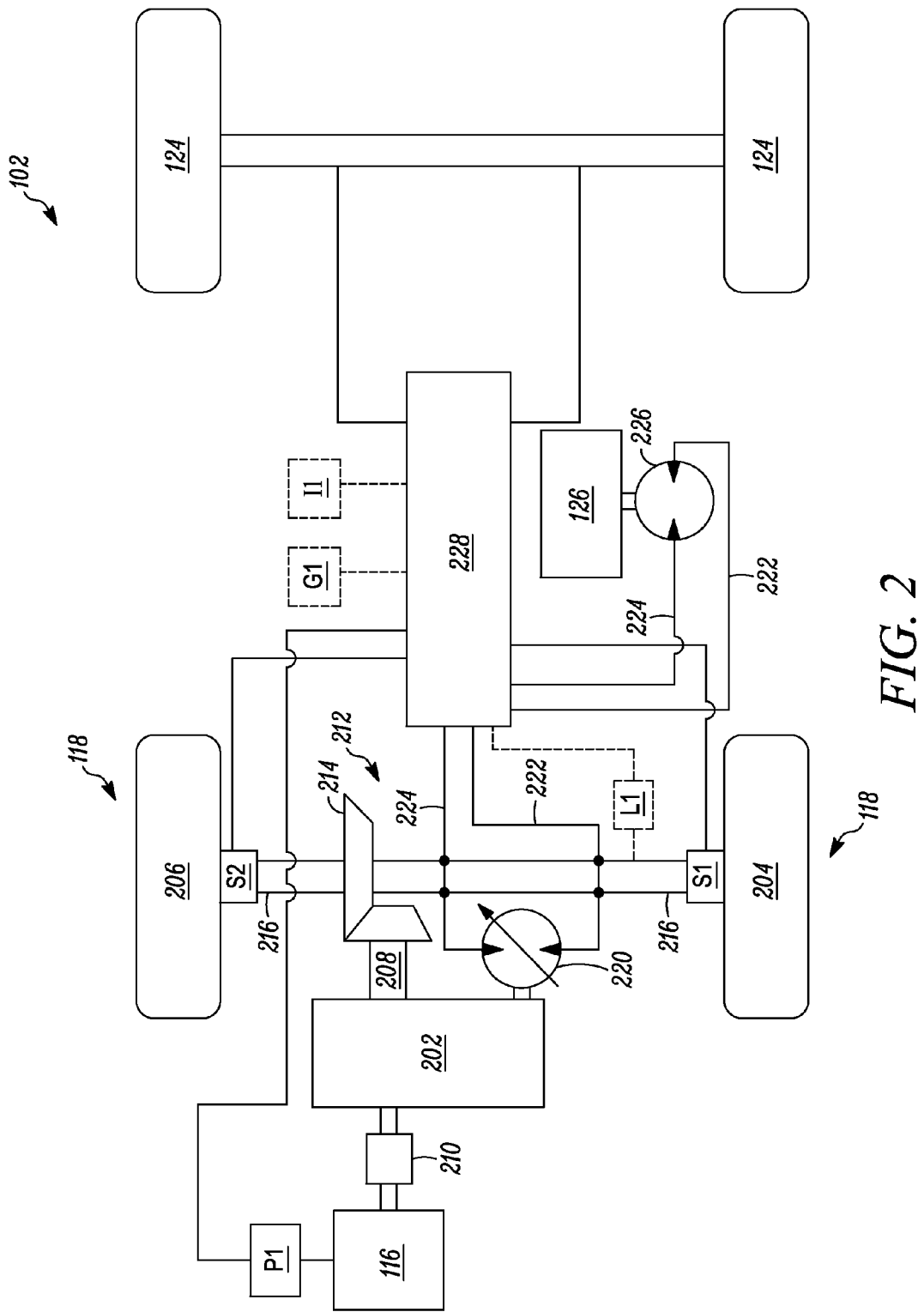
FIG. 2 is a diagrammatic view of a top-view of the machine shown in FIG. 1.
Figure 3:
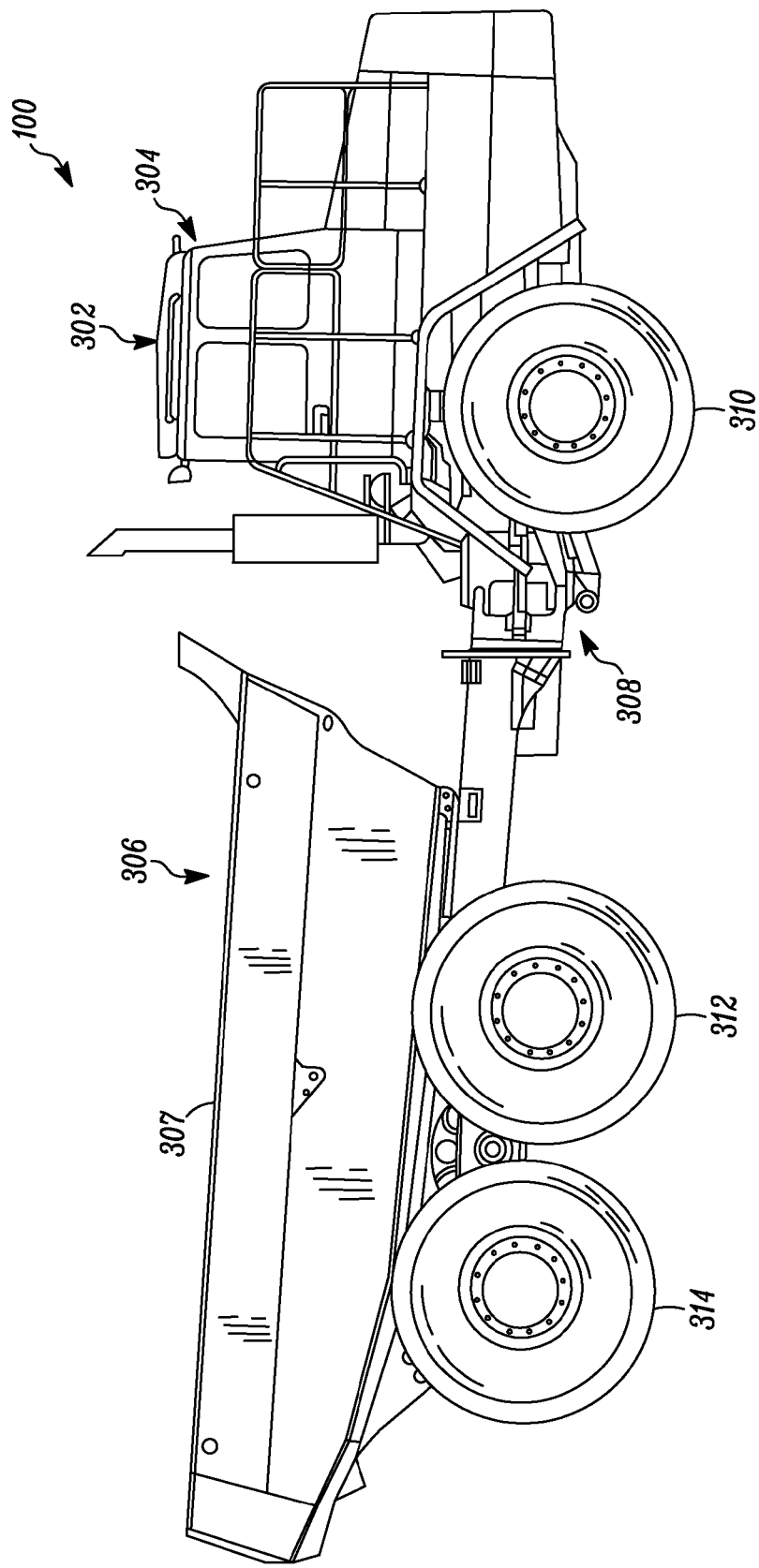
FIG. 3 is a diagrammatic view of another exemplary machine.

FIGS. 1 to 4 illustrate exemplary machines 100, according to one embodiment of the present disclosure. More specifically, the machine 100 illustrated in FIG. 1 is a wheel tractor scraper 102, whereas the machine 100 illustrated in FIG. 3 is an articulated truck 302. A person of ordinary skill in the art will appreciate that the machine 100 depicted in the accompanied figures are merely on an exemplary basis. It should be noted that the disclosure can be applied to any number of different types of wheeled machines used in construction, transportation, agriculture, and industry. For example, the machine 100 may be a motor grader, wheel harvester, rotary mixer, wheel skidder, four-wheel drive vehicle, quarry construction truck, large mining truck, wheel loader, or other machine.

Referring to FIG. 1, the wheel tractor scraper 102 may include a tractor portion 104, with a front frame section 106, and a scraper portion 108, with a rear frame section 110, that are pivotally coupled through an articulation hitch 112. Steering may be provided by one or more steering cylinders 114 mounted between the tractor portion 104 and scraper portion 108 on opposing sides of the wheel tractor scraper 102. The front frame section 106 may support a cooling system (not shown in the figures) and a power source 116. As shown in FIG. 2, the power source 116 may be operatively connected through a transmission 202 to drive front wheels 118 for primary propulsion of the wheel tractor scraper 102. The front frame section 106 may also support an operator station 120 for primary control of the wheel tractor scraper 102 during ordinary operations.

In one embodiment, as shown in FIG. 1, the rear frame section 110 may support a bowl 122 and rear wheels 124. The bowl 122 may also include a fluid powered implement 126, such as an elevator 128. Alternatively, an auger, a conveyor, a spade, and the like, may be used as the implement 126. The implement 126 may facilitate in penetration and/or loading of the material to be transported by the wheel tractor scraper 102.

The power source 116 may include for example, a diesel engine, a gasoline engine, a gaseous fuel powered engine such as a natural gas engine, a combination of known sources of power or any other type of power source apparent to one of skill in the art. The power source 116 may alternatively include a non-combustion source of power such as a fuel cell, a power storage device, an electric motor, or other similar mechanism. As shown in FIG. 2, the power source 116 may be operatively connected to the front wheels 118, more specifically to left and right wheel 204, 206, through the transmission 202. The transmission 202 may be configured to transmit power from the power source 116 to an output shaft 208 at a range of output speed ratios. The transmission 202 may be a hydraulic transmission, mechanical transmission, a hydro-mechanical transmission, an electric transmission, or any other suitable transmission known in the art. Alternatively, the transmission 202 may transmit power from the power source 116 at only a single output speed ratio. The transmission 202 may be connected to the power source 116 via a torque converter 210, a gear box, or in any other manner known in the art.

In one embodiment, the output shaft 208 may be operatively coupled through a transfer case or a differential 212 having one or more gears 214 to transmit power through a front axle 216 to drive the left and right wheel 204, 206 of the wheel tractor scraper 102. A person of ordinary skill in the art will appreciate that the differential 212 may equalize torque from one side to the other while allowing wheel speeds to be different. In an alternative embodiment, the wheel tractor scraper 102 may include an electric or hydraulic drive (not shown in figures). For example, the power source 116 may be operatively connected to a pump, such as a variable or fixed displacement hydraulic pump. The pump may produce a stream of pressurized fluid directed to one or more motors associated with the front wheels 118 for the primary means of propulsion.

Alternatively, the power source 116 may be drivably connected to an alternator or generator configured to produce an electrical current used to power one or more electric motors for driving the front wheels 118. In addition to driving the front wheels 118, the power source 116 may be configured to supply power to the implement 126 employed by the wheel tractor scraper 102 to penetrate and/or transfer material into the bowl 122. In one embodiment, shown in FIG. 2, the transmission 202 may be connected to a pump 220, which may be a variable displacement, variable delivery, fixed displacement, or any other pump configuration known in the art. It should be understood that while depicted as connected through the transmission 202, the pump 220 may be connected to the power source 116 directly, to the torque converter 210, or at any desirable location along the powertrain. The pump 220 may be fluidly connected through one or more supply and/or return lines 222, 224 to supply a flow of pressurized fluid to a hydraulic motor 226 operatively connected to the power implement 126.

Figure 4:
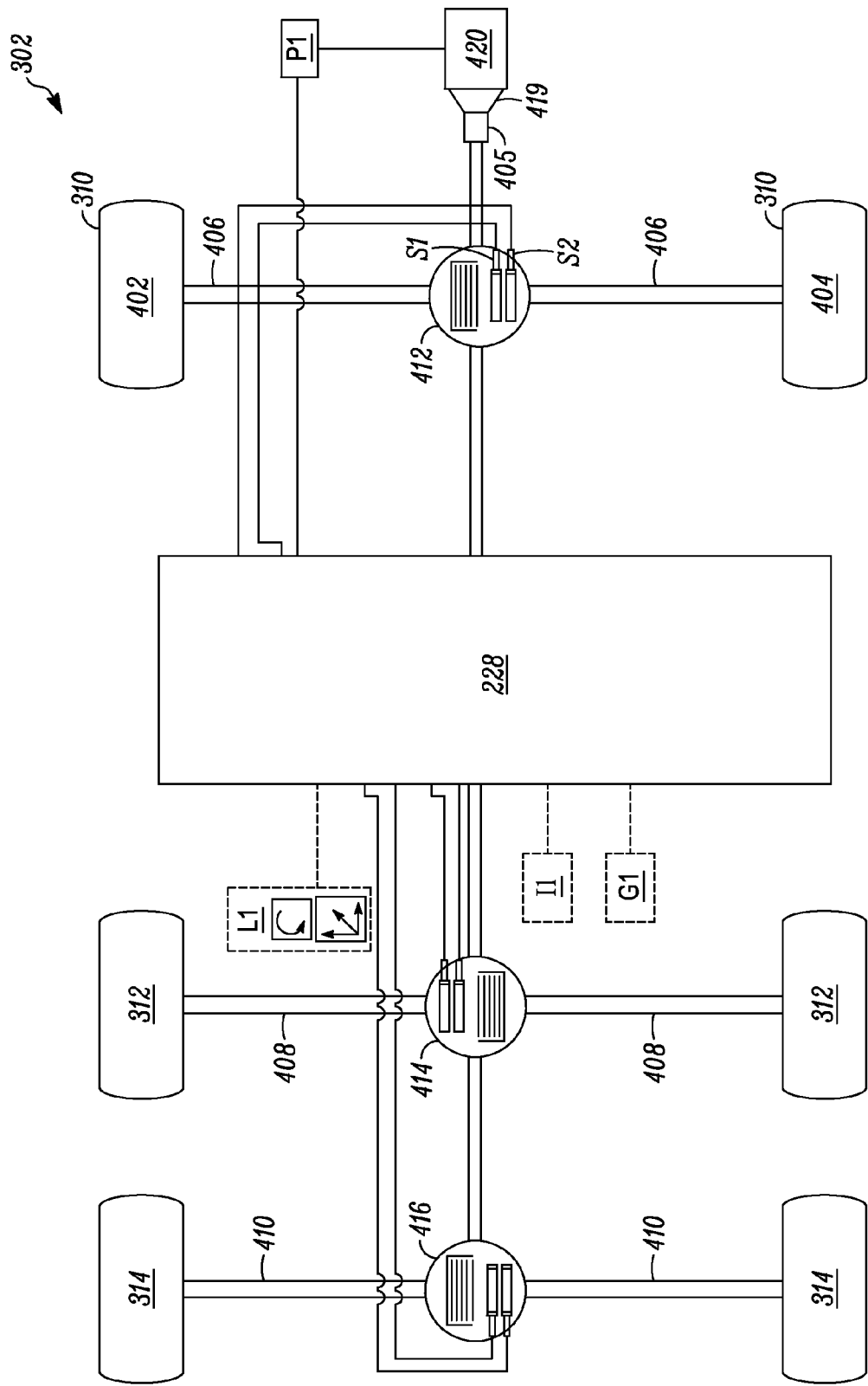
FIG. 4 is a diagrammatic view of the top view of the machine shown in FIG. 3.

Referring now to FIGS. 3 and 4, the machine 100 may include an articulated truck 302, according to one embodiment of the present disclosure. FIG. 3 depicts an articulated truck 302 having a front section 304 and a rear section 306. The rear section 306 of the articulated truck includes a dump body (hereinafter referred to as implement 307) to carry a load. The front and rear sections 304, 306 are linked at an articulation joint 308. The articulation joint 308 may permit relative movement about a vertical axis, enabling the articulated truck 302 to be steered. The front section 304 may include a front wheel set 310. The front wheel set 310 may include a left and right wheel 402, 404 respectively (see FIG. 4). Further the rear section 306 may include a center wheel set 312 and a rear wheel set 314. As illustrated in the accompanied figures, each wheel set includes at least one left wheel and one right wheel.

Further, a lower drive assembly may operably couple the front, center and rear wheel set 310, 312, 314 to a transmission 405. In the embodiment illustrated in FIG. 4, the lower drive assembly may include a series of axle sets and differentials. Accordingly, a front axle set 406, a center axle set 408 and a rear axle set 410 may be coupled to front, center and rear differentials 412, 414, 416 respectively.

The front, center, and rear axle sets 406, 408, 410 may be operably coupled to a drive shaft, which in turn may be coupled to an output shaft of the transmission 405. As is generally known, the front, center, and rear differentials 412, 414, 416 may allow side-to-side or cross-axle wheel speed differences, which equalizes torque delivered to each wheel of an axle and improves steering through corners. The drive shaft may include a front section and a rear section operably coupled by an inter-axle differential. The inter-axle differential may permit different wheel speeds between the front axle set 406 and the center and rear axle sets 408, 410.

The transmission 405 may be operatively coupled to a power source 420 via a torque converter 419. The power source 420 may be any source of power known in the art, for example a combustion engine such as a diesel engine or a gasoline engine. Further, the transmission 405 may be a power-shift transmission, a continuously variable transmission, or a hybrid transmission, as desired, and be configured to transmit a power output generated by the power source 420 to the front, center and rear differential 412, 414, 416 throughout a range of speed-to-torque ratios. Other alternative source of power may be coupled to the transmission 405, if desired, such as an electric motor, a fuel cell/motor combination, or another source known in the art.

A person of ordinary skill in the art will appreciate that the connections and components shown in FIGS. 1 to 4 are merely on an exemplary basis. The machine 100 may additionally include other components not described herein. The present disclosure relates to a control system 500 for the machine 100 shown in FIGS. 1 and 3. The control system 500 may include a controller 228 (see FIGS. 2, 4 and 5) configured to modulate a parameter of the power source 116, 420 of the machine 100 based, at least in part, on a position of the implement 126, 307 of the machine 100, in response to an occurrence of a wheel slip condition. In one embodiment, the occurrence of the wheel slip condition may be determined based on a comparison of the wheel speed and a localized speed of the machine 100 near the wheel. In another embodiment, the controller 228 may be configured to reduce a wheel slip of the machine 100 based, at least in part, on the modulation of the parameter of the power source 116, 420.

Figure 5:
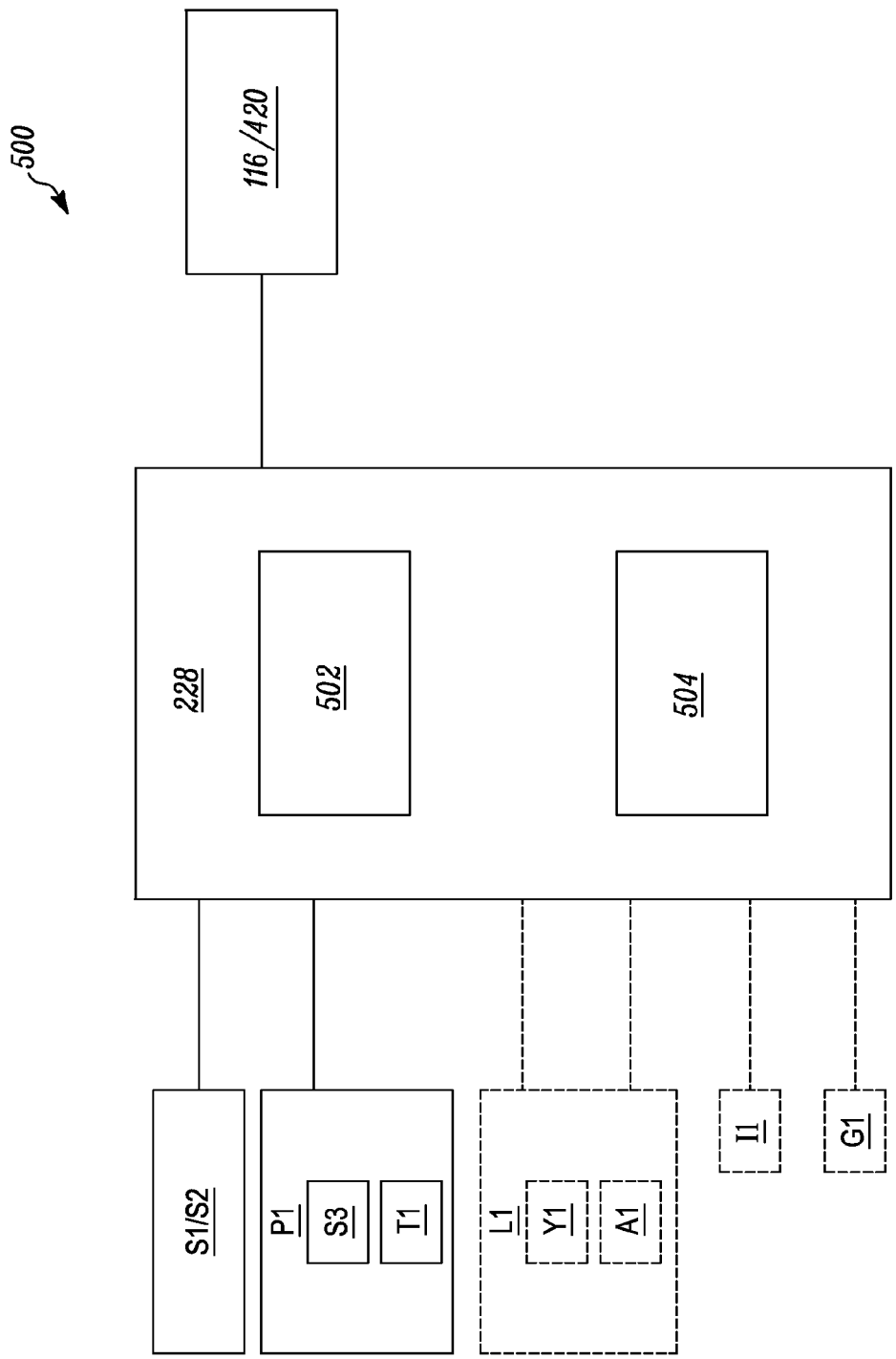
FIG. 5 is a block diagram of a control system for the machines shown in FIGS. 1 and 3.

FIG. 5 illustrates a block diagram of the control system 500 for the machine 100 having the transmission 202, 405. In one embodiment, the control system 500 may include a wheel speed sensor (hereinafter including the first and second wheel speed sensor S1, S2) and the controller 228. Also, the control system 500 may include a power source module P1. As shown in the accompanied figures, the controller 228 is in communication with the wheel speed sensor S1, S2 and the power source module P1. A person of ordinary skill in the art will appreciate that this arrangement is merely on an exemplary basis and does not limit the scope of the present disclosure.

The wheel speed sensor S1, S2 may be configured to generate a signal indicative of a wheel speed of the machine 100. In one embodiment, the wheel speed sensor S1, S2 may be configured to generate a signal indicative of each of the left and right wheel speed of the machine 100 respectively. It will be apparent to one of ordinary skill in the art that the wheel speed of the left and right wheel 204, 206, 402, 404 of the machine 100 may be the same or different. In one situation when the differential 212, 412 of the machine 100 is in an unlocked mode, the front axle 216, 406 of the machine 100 may be supplied with substantially equal amounts of torque by the differential 212, 412. However, the speed of each of the left and right wheel 204, 206, 402, 404 may be different when the differential 212, 412 is operating in the unlocked mode. Alternatively, in another situation, the differential 212, 412 may be in a locked mode. In this case, the differential 212, 412 may be configured to drive the front axle 216, 406 associated with the left and right wheel 204, 206, 402, 404 at about the same speeds, regardless of an amount of torque supplied.

It should be understood that additional wheel speed sensors may be coupled to any of the left and right wheels coupled to any one or combination of the front, rear, and center axle of the machine 100 without any limitation. A person of ordinary skill in the art will appreciate that the wheel speed may be obtained using any sensor known in the art that may be located within the machine 100 itself, depending upon the application. It should be noted that the wheel speed may be measured directly by detecting the rotational velocity of the respective wheels, or indirectly by sensing parameters from which wheel speeds may be inferred. One example of indirectly detecting wheel speed would be to provide sensors that measure the rotational velocity of components coupled to the front wheels 118, 310, such as components of the differential 212, 412.

In one embodiment, the machine 100 may include the power source module P1 coupled to the power source (see FIGS. 2 and 4). The power source module P1 may be configured to generate a signal indicative of the parameter of the power source 116, 420. In another embodiment, the power source module P1 may include a power source speed sensor S3 and a torque sensor T1. The power source speed sensor S3 may be configured to generate a signal indicative of a speed of the power source 116, 420. The torque sensor T1 may be configured to generate a signal indicative of the torque output from the power source 116, 420. Alternatively, the power source module P1 may determine the speed of the power source 116, 420 and/or the torque output from the power source 116, 420 using any other known method in the art. In another embodiment the power source module P1 may compute the speed of the power source 116, 420 and/or the torque output from the power source 116, 420 based upon a combination of measured signals, such as, for example signals indicative of intake manifold pressure, and other calculated signals.

Further, as shown in FIGS. 2, 4 and 5, an implement position sensor I1 may be optionally coupled to the controller 228. The implement position sensor I1 may be configured to generate a signal indicative of the position of the implement 126, 307 of the machine 100. The implement 126, 307, for example, may either be in a working position or an idle position. Further, the controller 228 may be optionally coupled to the gear module G1. The gear module G1 may generate a signal indicative of a position of the gear. In one embodiment, the position of the gear may be indicative of the position of the transmission 202, 405 of the machine 100.

In one embodiment of the present disclosure, the controller 228 may modulate the speed of the power source 116, 420 if the position of the implement 126, 307 is indicative of a working position of the implement 126, 307. In another embodiment, the controller 228 may be configured to modulate the torque output from the power source 116, 420 if the position of the implement 126, 307 is indicative of an idle position of the implement 126, 307.

In one embodiment, a throttle position sensor may be optionally coupled to the controller 228. The throttle position sensor may be configured to generate a signal indicative of the position of a throttle of the machine 100. The position of the throttle may be indicative of the speed of the power source 116, 420 that the operator is demanding. Additionally, the machine 100 may include other sensors such as, for example, a brake sensor which may be directly or indirectly coupled to the controller 228. It should be noted that the positioning of the sensors on the machine 100 illustrated in the accompanied figures is on an exemplary basis and may vary without any limitation.

A person of ordinary skill in the art will appreciate that the occurrence of the wheel slip condition may be determined in a variety of ways known in the art. In one embodiment, the controller 228 may determine the occurrence of the wheel slip condition based on an input received from an operator of the machine 100. The operator of the machine 100 may detect the occurrence of the wheel slip condition based on his machine operating skills.

Alternatively, the controller 228 may determine the occurrence of the wheel slip condition based on a comparison between the wheel speed of the machine 100 and the localized speed of the machine 100 near the wheel. It should be understood that the localized speed of the machine 100 near the wheel is used to identify the true speed over the ground of an axle end for a particular wheel of the machine 100.

In one embodiment, as illustrated in FIG. 5, the controller 228 may be optionally coupled to a localized machine speed module L1. In one embodiment, the localized machine speed module L1 may include a yaw rate sensor Y1 and an acceleration sensor A1. As shown the accompanied figures, the yaw rate sensor Y1 and the acceleration sensor A1 may be packaged together in the localized machine speed module L1. Alternatively, the yaw rate sensor Y1 and the acceleration sensor A1 may be packaged separately.

The yaw rate sensor Y1 may generate a signal indicative of the yaw rate of the machine 100. A person of ordinary skill in the art will appreciate that the yaw rate sensor Y1 may include a relatively small tuning fork made of silicon that is capable of oscillating or vibrating at a very high frequency. Certain forces may act on members of the tuning fork which may become unbalanced if the machine 100 rotates in a particular plane. The degree of unbalance may be dependent on the rotation rate of the machine 100. For the articulated truck 302, the yaw rate sensor Y1 may measure the yaw rate of the front section 304, from which the yaw rate of the rear section 306 may be estimated if needed. Moreover, the articulated truck 302 may include a second yaw rate sensor for measuring a yaw rate of the rear section 306.

Alternatively, in another embodiment, the yaw rate of the machine 100 may be indirectly derived from a signal obtained from an orientation sensor. The orientation sensor may be configured to be responsive to an orientation of the machine 100, allowing the yaw rate of the machine 100 to be accordingly derived. In other words, the orientation sensor may provide information regarding an orientation of the machine 100 with respect to a base reference. For example, the base reference may be a reference axis such as a longitudinal axis extending along a length of the machine 100, and the orientation sensor may detect an angle of orientation of the machine 100 about that axis.

Further, the machine orientation may be measured with respect to a fixed, rather than relative, base reference. Exemplary orientation sensors may include magnetic compass chips, or other devices from which the orientation of the machine 100 may be derived. In one embodiment, the orientation of the machine 100 may be directly measured by having one or more global positioning system (GPS) receivers mounted on the machine. This approach may be useful and practical with a localized GPS enhancement system on a worksite.

The acceleration sensor A1 may generate a signal indicative of at least one of the longitudinal, lateral and vertical components of acceleration of the machine 100. It should be understood that the longitudinal component of the acceleration is of importance in determining the localized speed of the machine 100 near the wheel. Alternatively, in one embodiment, any combination of the longitudinal, lateral and/or vertical components may be utilized to determine the localized speed of the machine 100 near the wheel.

In one embodiment, positioning of the yaw rate sensor Y1 and the acceleration sensor A1 may vary depending upon a type of the machine 100. For example, in one embodiment, the yaw rate sensor Y1 and the acceleration sensor A1 may be located on a frame and ahead of the front axle 216 of the wheel tractor scraper 102. In another embodiment, in case of the articulated truck 302 the yaw rate sensor Y1 and acceleration sensor A1 may be located on a frame of the articulated truck 302 and over the front axle 406. It should be noted that in case the yaw rate sensor Y1 and the acceleration sensor A1 are packaged separately, the yaw rate sensor Y1 may be positioned anywhere on the machine 100.

Referring to FIG. 5, the localized machine speed module L1 may be configured to generate at least one signal indicative of the yaw rate of the machine 100 and a longitudinal component of the acceleration of the machine 100. It should be noted that the localized machine speed module L1 may either be intrinsic or extrinsic to the controller 228. Moreover, the localized machine speed module L1 may include any software or physical sensor known in the art to provide the corresponding signals to the controller 228. In one case, the localized machine speed module L1 may receive signals from various other sources and perform computations on the received signals to generate the at least one signal indicative of yaw rate of the machine 100 and the longitudinal acceleration component.

In one embodiment, the controller 228 may determine the localized speed of the machine 100 near the wheel. The localized speed of the machine 100 near the wheel may be determined by a number of ways. In one example, the controller 228 may include a localized speed estimator module 502. The localized speed estimator module 502 may be configured to determine the localized speed of the machine 100 near the wheel based, at least in part, on the wheel speed signal, the yaw rate signal and the acceleration signal of the machine 100 received from the localized machine speed module L1.

A person of ordinary skill in the art will appreciate that the localized speed of the machine 100 near the wheel may also be based on the track width of the machine 100. In one embodiment, the localized speed of the machine 100 near the wheel may be computed separately either for each of the wheels or combined for wheels attached to the same axle of the machine 100. It should be noted that the localized speed estimator module 502 may either be a separate component coupled to the controller 228 or may be intrinsic to the controller 228. The localized speed estimator module 502 described herein is on an exemplary basis and does not limit the scope of the disclosure. A person of ordinary skill in the art will appreciate that other methods known in the art may be utilized to determine the localized speed of the machine 100 near the wheel.

Moreover, in one embodiment, based on the localized speed of the machine 100 near the wheel determined by the localized speed estimator module 502, a target speed estimator module 504 may generate a target speed estimate near the wheel. The target speed estimate near the wheel may be equal to a pre-determined deviation from the determined localized speed of the machine 100 near the wheel. In one embodiment, the pre-determined deviation may include a speed limit and/or a fixed percentage of the determined localized speed of the machine 100 near the wheel. For example, the pre-determined deviation may either be 0.75 m/s or 15% of the localized speed about the wheel. Accordingly, the target speed estimate near the wheel may either be 0.75 m/s or 1.15 times of the localized speed of the machine 100 near the wheel.

In one embodiment, the target speed estimate near the wheel may be a maximum value of the speed limit and the fixed percentage of the determined localized speed of the machine 100 near the wheel. A person of ordinary skill in the art will appreciate that when the machine 100 is running at relatively higher speeds, the pre-determined deviation used may be fixed percentage of the determined localized speed of the machine 100 near the wheel. In one example, at slower machine speed, the pre-determined deviation used may be the fixed speed limit while at higher machine speed, the fixed percentage may be utilized.

In another embodiment, the target speed estimate near the wheel may be a minimum value of the speed limit and the fixed percentage of the determined localized speed of the machine near the wheel. In yet another embodiment, a blend of the speed limit and the fixed percentage of the determined localized speed of the machine 100 near the wheel may be utilized. Moreover, in one embodiment the pre-determined deviation may differ based on a type of the machine 100.

For example, in case of the wheel tractor scraper 102, the speed limit may be 0.75 m/s whereas, in case of the articulated truck 302, the speed limit may be 0.3 m/s. It may be understood that this variation based on the type of the machine 100 may depend on a need of wheel slippage according to the application of the machine 100. A person of ordinary skill in the art will appreciate that the values provided herein are merely on an exemplary basis and do not limit the scope of the disclosure. In one embodiment, the target speed estimator module 504 may be intrinsic to the controller 228. Alternatively, the target speed estimator module 504 may be communicatively coupled to the controller 228.

As shown in FIG. 5, the controller 228 may be directly coupled to the power source 116, 420. Alternatively, the controller 228 may be indirectly coupled to the power source 116, 420. The controller 228 may compare the wheel speed and the target speed estimate near the wheel. In one embodiment, the controller 228 may compare and determine if either or both of the left and right wheel speed exceeds the target speed estimate about the respective wheel. In another embodiment, the controller 228 may compute the difference between the wheel speed and the target speed estimate near the wheel Accordingly, if wheel speed is greater than the target speed estimate near the respective wheel, the controller 228 may modulate the parameter of the power source 116, 420. A person of ordinary skill in the art will appreciate that in case the differential lock is engaged, the modulation by the controller 228 may take place when both the left and right wheel speeds exceed the respective target speed estimate about the respective wheel, since the speed of the left and right wheel 204, 206, 402, 404 may be the same.

The parameter of the power source 116, 420 may include at least one of the speed of the power source 116, 420 and the torque output from the power source 116, 420. In one exemplary situation, the controller 228 may modulate the speed of the power source 116, 420 by sending required control signals to the power source 116, 420 if the implement 126, 307 is in the working position. In another situation, the controller 228 may modulate the torque output from the power source 116, 420 by sending necessary control signals to the power source 116, 420 if the implement 126, 307 is in the idle position. In yet another situation, the controller 228 may issue control signals to the power source 116, 420 to modulate both the speed of the power source 116, 420 and also the torque output from the power source 116, 420 based, for example, on a hydraulic demand of the implement 126, 307 of the machine 100. In one embodiment, the controller 228 may also be coupled to the torque converter 210, 419, in order to control the torque output from the power source 116, 420.

Moreover, the controller 228 may also monitor the modulation in the speed of the power source 116, 420 and/or the torque output from the power source 116, 420 via the power source module P1. In one embodiment, the modulation of the speed of the power source 116, 420 and/or the torque output from the power source 116, 420 may be activated by an operator command. The operator command may be issued to the controller 228 based on input received from an operator of the machine 100 by using, for example, an activation button, a lever, a switch, and the like. Similarly, in another embodiment, the de-activation of the control system 500 may be based on the operator command.

It should be noted that the localized speed estimator module 502 and the target speed estimator module 504 may be components intrinsic or extrinsic to the controller 228. The controller 228 may embody a single microprocessor or multiple microprocessors that include a means for receiving input from the sensors and providing output to the power source and/or torque converter of the machine 100. Numerous commercially available microprocessors may be configured to perform the functions of the controller 228. It should be appreciated that the controller 228 may readily embody a general machine microprocessor capable of controlling numerous machine functions. A person of ordinary skill in the art will appreciate that the controller 228 may additionally include other components and may also perform other functionality not described herein.

Figure 6:
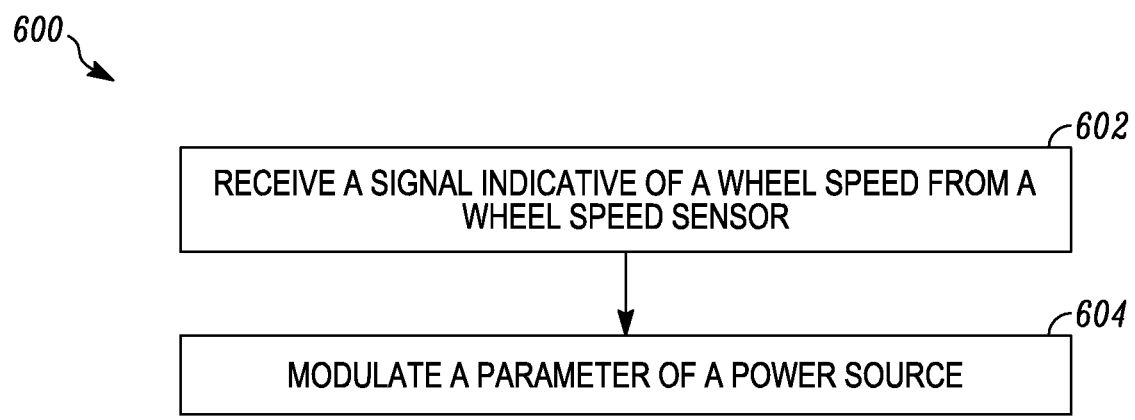
FIG. 6 is a process for controlling the machines shown in FIGS. 1 and 3.

A method 600 for reducing wheel slip of the machine 100 will be described in detail in connection with FIG. 6.

INDUSTRIAL APPLICABILITY

Machine 100 may operate on a variety of surfaces and terrains. Weather conditions and soil or rock types may cause wheel slippage and wheel spin, and also affect traction of the machine 100 and machine operating efficiency. Due to wheel slippage, fuel consumption of the machine 100 may increase. Specifically when the tires of the machine are engaged in damp mud, sharp rocks embedded in the mud may cause the tires to get sliced or damaged.

As described above, the present disclosure relates to the control system 500 in which the controller 228 is configured to reduce the wheel slip of the machine 100 based, at least in part, on the modulation of the parameter of the power source 116, 420. In one embodiment, the modulation of the parameter of the power source 116, 420 may be based, at least in part, on the position of the implement 126, 307, in response to the occurrence of the wheel slip condition.

A person of ordinary skill in the art will appreciate that the occurrence of the wheel slip condition may be determined in a number of ways. In one embodiment, the occurrence of the wheel slip condition may be determined based on a comparison of the wheel speed and the localized speed of the machine 100 near the wheel. Accordingly, based on determination of the occurrence of the wheel slip condition, the controller 228 may modulate the speed of the power source 116, 420 and/or the torque output of the power source 116, 420. The method 600 for reducing the wheel slip in the machine 100 will now be described in detail.

At step 602, the signal indicative of the wheel speed may be received from the wheel speed sensor S1, S2. In one embodiment, the left and right wheel speed are received from the first and second wheel speed sensor S1, S2. It should be noted that as explained earlier, the speed of the left and right wheel 204, 206, 402, 404 may be the same or different.

In one embodiment, the signal indicative of the parameter of the power source 116, 420 may be received from the power source module P1. In another embodiment, the power source module P1 may include the power source speed sensor S3 and the torque sensor T1. The parameter of the power source 116, 420 may include the speed of the power source 116, 420 and/or the torque output from the power source 116, 420. It should be noted that the signal generated by the power source module P1 may also be indirectly derived or computed based on one or more measured signals.

In one embodiment, the controller 228 may receive the signal indicative of the position of the implement 126, 307 from the implement position sensor I1. Also, the controller 228 may receive the signal indicative of the position of the transmission 202, 405 from the signal indicative of the position of the gear, as generated by the gear module G1. A person of ordinary skill in the art will appreciate that other methods known in the art to determine the position of the implement 126, 307 may also be utilized without any limitation.

At step 604, the controller 228 may modulate the parameter of the power source 116, 420, based on the determined occurrence of the slip condition. The occurrence of the wheel slip condition may be determined in a variety of ways. In one embodiment, the controller 228 may determine the occurrence of the wheel slip condition based on the input received from the operator of the machine 100.

Alternatively, in another embodiment, the controller 228 may determine the occurrence of the wheel slip condition based on the comparison between the wheel speed and the localized speed of the machine 100 near the wheel. It should be noted that the localized speed of the machine 100 near the wheel may be computed by any method known in the art. In one example, the localized speed of the machine 100 may be determined by the localized speed estimator module 502 based on the signals received from the localized machine speed module L1. The localized speed estimator module 502 may compute the localized speed of the machine 100 near the wheel based on the wheel speed, the yaw rate signal and the acceleration signal of the machine 100.

Further, in one embodiment, the localized speed estimator module 502 may determine the estimated localized speed for each of the left and right wheel 204, 206, 402, 404 of the machine 100. In one embodiment, the localized speed of the machine 100 near the wheel may be based on a co-relation of either of the left and right wheel speed, the speed of the power source 116, 420, the yaw rate signal, longitudinal component of the acceleration and also track width of the machine 100.

More specifically, in an exemplary situation, the localized speed of the machine 100 near the wheel may be based on computation wherein a center speed of the machine 100 is computed and then adjustment for each side is based on the yaw rate of the machine 100 multiplied by half the track width of the machine 100. It should be understood that the computation of the localized speed of the machine 100 near the wheel may be based on known mathematical functions.

Thereafter, the controller 228 may compare the wheel speed and the localized speed of the machine 100 near the wheel. In one embodiment, as described above, the target speed estimator module 504 may determine the target speed estimate near the wheel based on the pre-determined deviation from the localized speed of the machine 100 near the wheel. The pre-determined deviation may either be the fixed speed limit or the percentage of the determined localized speed of the machine 100 near the wheel. In one embodiment, the pre-determined deviation may be the maximum, minimum or the blend of the fixed speed limit and the percentage of the determined localized speed of the machine 100 near the wheel. Moreover, in one embodiment, the pre-determined deviation may be based on the type of the machine 100.

It should be understood that the comparison may involve determining if any or both of the left and right wheel speed exceeds the target speed estimated for that particular wheel. Moreover, the controller 228 may determine the difference between the wheel speed and the target speed estimate near the wheel.

Further, the controller 228 may modulate the parameter of the power source 116, 420. In one embodiment, the controller 228 may modulate the parameter of the power source 116, 420 by issuing appropriate control signals to modulate the speed of the power source 116, 420 and/or the torque output from the power source 116, 420. Moreover, in another embodiment, the modulation of the parameter of the power source 116, 420 by the controller 228 may be based, at least in part, on the position of the implement 126, 307, in response to the occurrence of the wheel slip condition. In one exemplary situation, the wheel slip condition may be determined by the controller 228 if wheel speed is greater than the pre-determined deviation from the determined localized speed of the machine 100 near the wheel.

As described earlier, the position of the implement 126, 307 may determined based on signals received from the implement position sensor I1. Accordingly, in one embodiment, the controller 228 may modulate the speed of the power source 116, 420 when the implement 126, 307 is in the working condition. Further, the controller 228 may issue control signals to modulate the torque output from the power source 116, 420 when the implement 126, 307 is in the idle condition. In another embodiment, the controller 228 may issue control signals to modulate both the speed of the power source 116, 420 and the torque output from the power source 116, 420.

In yet another embodiment, the modulation of the parameter of the power source 116, 420 may be manually or automatically activated. It should be noted that the wheel tractor scraper 102 and the articulated truck 302 are exemplary machines on which the disclosed control system 500 may be utilized. Further, depending on the type of the machine 100, the control system 500 may be utilized in connection with any of the axles of the machine 100 to reduce wheel slip. A person of ordinary skill in the art will appreciate that the control system 500 may be additionally used on other machinery not described herein.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for a machine having a transmission system, the control system comprising:
    a first wheel speed sensor configured to generate a first signal indicative of a first wheel speed of the first wheel;
    a second wheel speed sensor configured to generate a second signal indicative of a second wheel speed of the second wheel; and
    a controller in communication with the first wheel speed sensor and the second wheel speed sensor, the controller configured to:
        calculate a first localized speed of the machine over the ground near the first wheel and to further calculate a second localized speed of the machine over the ground near the second wheel; and
        modulate a parameter of a power source based, at least in part, on a comparison of one of the first wheel speed and the first localized speed of the machine or the second wheel speed and the second localized speed of the machine.

2. The control system of claim 1, wherein the machine is one of an articulated truck, a wheel tractor scraper, and a quarry truck.

3. The control system of claim 1, wherein the controller is configured to determine the first localized speed of the machine at a first axle-end at the first wheel and the second localized speed of the machine at a second axle-end at the second wheel.

4. The control system of claim 1, wherein the first localized speed of the machine near the first wheel is based, at least in part, on the first signal, a yaw rate signal, and an acceleration signal of the machine.

5. The control system of claim 4 further including a localized machine speed module configured to generate at least one signal indicative of a yaw rate and a longitudinal component of the acceleration of the machine.

6. The control system of claim 5, wherein the localized machine speed module includes a yaw rate sensor and an acceleration sensor.

7. The control system of claim 6, wherein the yaw rate sensor and acceleration sensor is located on a frame and over the front axle of an articulated truck.

8. The control system of claim 6, wherein the yaw rate sensor and acceleration sensor is located on a frame and ahead of the front axle of a wheel tractor scraper.

9. The control system of claim 1, wherein the comparison is based on a pre-determined deviation between a wheel speed of the first or second wheel and the localized speed of the machine near the respective wheel.

10. The control system of claim 9, wherein the pre-determined deviation further includes at least one of a wheel speed limit and a fixed percentage of the determined localized speed of the machine near the respective wheel.

11. The control system of claim 9, wherein the pre-determined deviation is based on a type of the machine.

12. The control system of claim 1, wherein the modulation of a parameter of a power source is based on an operator command.

13. The control system of claim 1, wherein the controller is configured to modulate a speed of the power source.

14. The control system of claim 1, wherein the controller is configured to modulate a torque output from the power source.

15. The control system of claim 1, wherein the controller is configured to modulate a parameter of a power source based on a position of an implement of the machine.

16. The control system of claim 15, wherein the controller is configured to modulate:
    a speed of the power source if the position of the implement is indicative of a working position of the implement; and
    a torque output from the power source if the position of the implement is indicative of an idle position of the implement.

17. The control system of claim 15 further including an implement position sensor configured to generate a position of the implement of the machine.

18. The control system of claim 15 further including a gear module configured to provide a position of the gear.

19. The control system of claim 1 further including a differential lock.

20. The control system of claim 1 further including a power source module configured to generate a signal indicative of the parameter of the power source.

21. The control system of claim 20, wherein the power source module includes a power source speed sensor and a torque sensor.

22. The control system of claim 1 further including a throttle position sensor configured to generate a signal indicative of a position of the throttle.

23. The control system of claim 22, wherein the position of the throttle is indicative of the speed of the power source.

24. The control system of claim 1, wherein the transmission system includes:
    a transmission operably coupled to at least one axle, and
    at least one wheel coupled to the at least one axle.

25. The control system of claim 1, wherein the controller is configured to reduce a wheel slip of the machine based, at least in part, on the modulation of a parameter of a power source.

26. A machine comprising:
    a power source coupled to a transmission;

at least one axle operably coupled to the transmission;
at least one wheel coupled to the at least one axle;
an implement for performing one or more desired operations; and
a control system including:
a wheel speed sensor coupled with the at least one wheel, wherein the wheel speed sensor is configured to generate a signal indicative of a wheel speed; and
a controller in communication with the wheel speed sensor, the controller configured to determine a localized speed of the machine over the ground at an axle end of the at least one axle closest to the at least one wheel and modulate a parameter of a power source based, at least in part, on a position of the implement of the machine, in response to an occurrence of a wheel slip condition based on a comparison of the signal indicative of wheel speed and the localized speed of the machine at the axle end.

27. A computer based system for controlling a machine having a transmission system, the computer based system comprising:
a communication interface communicating with a memory;
the memory configured to communicate with a processor; and
the processor, in response to executing a computer program, performs operations comprising:
receiving a signal indicative of a wheel speed of a wheel from a wheel speed sensor;
calculating a localized ground speed of the machine at an axle end at the wheel; and
modulating a parameter of a power source based, at least in part, on a comparison of the wheel speed with the localized ground speed of the machine.

* * * * *